(12) United States Patent
Witkowski et al.

(10) Patent No.: US 7,257,426 B1
(45) Date of Patent: *Aug. 14, 2007

(54) WIRELESS COMMUNICATIONS SYSTEMS AND METHOD

(75) Inventors: Todd R. Witkowski, Zeeland, MI (US); Kurt A. Dykema, Holland, MI (US); Steven L. Geerlings, Holland, MI (US); Mark L. Zeinstra, Holland, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/979,199

(22) PCT Filed: May 26, 2000

(86) PCT No.: PCT/US00/14692

§ 371 (c)(1),
(2), (4) Date: Apr. 29, 2002

(87) PCT Pub. No.: WO00/72463

PCT Pub. Date: Nov. 30, 2000

Related U.S. Application Data

(60) Provisional application No. 60/135,979, filed on May 26, 1999.

(51) Int. Cl.
*H04M 1/00* (2006.01)
(52) U.S. Cl. .............................. 455/569.2; 455/569.1; 455/41.2; 455/41.3; 455/563
(58) Field of Classification Search ............. 455/569.2, 455/569.1, 563, 41.1, 41.2, 41.3, 413, 412.1, 455/412.2, 566
See application file for complete search history.

(56) References Cited

U.S. PATENT DOCUMENTS 4,731,811 A * 3/1988 Dubus ........................ 455/563

(Continued)

FOREIGN PATENT DOCUMENTS

DE 3417956 11/1985

(Continued)

OTHER PUBLICATIONS

Briody et al., "Intel to launch wireless initiative", Infoworld, May 18, 1998, 2 pgs.

(Continued)

*Primary Examiner*—Lewis West
(74) *Attorney, Agent, or Firm*—Foley & Lardner LLP

(57) ABSTRACT

A wireless communications system and method adapted for use in automotive applications for enabling automatic, high-speed, wireless voice and/or data communications link to be established between a wide variety of external devices and various electronic subsystems of a vehicle. The apparatus includes first and second RF transceivers which are operated in accordance with a communications specification to enable a seamless, automatic communications link to be created when the two RF transceivers come within a pre-determined proximity of one another, for example, within up to 100 meters of one another. Information from one device is then automatically transmitted over the wireless communications link to the other device. In various implementations the apparatus is used to obtain information from a home PC, a work PC, a notebook PC and various other electronic devices, as well as information from the Internet, which is displayed and/or played back for the user by various subsystems of the vehicle while traveling in the vehicle. Other applications involving retail and manufacturing applications are disclosed by which the apparatus is used to facilitate and/or expedite manufacturing processes or retail transactions via one or more high-speed, secure, wireless communications links which are created automatically and seamlessly between the RF transceivers of the apparatus of the invention.

26 Claims, 13 Drawing Sheets

U.S. PATENT DOCUMENTS

| | | | | |
|---|---|---|---|---|
| 4,875,229 A * | 10/1989 | Palett et al. | ............... | 381/86 |
| 4,905,270 A * | 2/1990 | Ono | ............... | 455/569.2 |
| 5,584,052 A * | 12/1996 | Gulau et al. | ............... | 455/79 |
| 5,625,673 A | 4/1997 | Grewe et al. | | |
| 5,651,056 A * | 7/1997 | Eting et al. | ............... | 379/88.01 |
| 5,661,651 A | 8/1997 | Geschke et al. | | |
| 5,732,074 A | 3/1998 | Spaur et al. | | |
| 5,758,300 A | 5/1998 | Abe | | |
| 5,797,088 A | 8/1998 | Stamegna | ............... | 455/345 |
| 5,810,420 A * | 9/1998 | Welling | ............... | 296/97.5 |
| 5,832,390 A * | 11/1998 | Irvin | ............... | 455/569.2 |
| 5,844,473 A | 12/1998 | Kaman | | |
| 5,859,628 A | 1/1999 | Ross et al. | | |
| 5,889,472 A | 3/1999 | Nagel et al. | | |
| 5,889,474 A * | 3/1999 | LaDue | ............... | 340/825.49 |
| 5,898,392 A | 4/1999 | Bambini et al. | ............... | 340/996 |
| 5,974,333 A | 10/1999 | Chen | ............... | 455/569 |
| 5,974,334 A | 10/1999 | Jones, Jr. | | |
| 5,995,898 A | 11/1999 | Tuttle | | |
| 6,023,241 A | 2/2000 | Clapper | | |
| 6,038,441 A * | 3/2000 | Slaven et al. | ............... | 455/413 |
| 6,052,603 A | 4/2000 | Kinzalow et al. | ............... | 455/557 |
| 6,055,468 A | 4/2000 | Kaman et al. | | |
| 6,058,298 A | 5/2000 | Stamegna | ............... | 455/345 |
| 6,058,319 A | 5/2000 | Sadler | ............... | 455/569 |
| 6,069,588 A | 5/2000 | O'Neill, Jr. | ............... | 343/713 |
| 6,081,237 A | 6/2000 | Sato et al. | | |
| 6,085,078 A | 7/2000 | Stamegna | ............... | 455/345 |
| 6,134,456 A | 10/2000 | Chen | ............... | 455/569 |
| 6,144,114 A | 11/2000 | Chutorash | | |
| 6,154,663 A * | 11/2000 | Itamochi | ............... | 455/569.2 |
| 6,173,195 B1 | 1/2001 | Chen | ............... | 455/569 |
| 6,198,947 B1 * | 3/2001 | Barber | ............... | 455/563 |
| 6,215,449 B1 | 4/2001 | O'Neill, Jr. | ............... | 343/713 |
| 6,218,958 B1 | 4/2001 | Eichstaedt et al. | | |
| 6,236,333 B1 | 5/2001 | King | | |
| 6,285,757 B1 * | 9/2001 | Carroll et al. | ............... | 345/619 |
| 6,304,764 B1 | 10/2001 | Pan | ............... | 455/569 |
| 6,308,083 B2 | 10/2001 | King | | |
| 6,340,928 B1 | 1/2002 | McCurdy | | |
| 6,349,222 B1 | 2/2002 | Hafiz | ............... | 455/569 |
| 6,377,825 B1 * | 4/2002 | Kennedy et al. | ............... | 455/569.2 |
| 6,389,337 B1 | 5/2002 | Kolls | ............... | 701/29 |
| 6,397,086 B1 | 5/2002 | Chen | ............... | 455/569 |
| 6,408,232 B1 | 6/2002 | Cannon et al. | | |
| 6,484,040 B1 | 11/2002 | Wang | ............... | 455/569 |
| 6,532,374 B1 | 3/2003 | Chennakeshu et al. | | |
| 6,542,758 B1 * | 4/2003 | Chennakeshu et al. | ...... | 455/557 |
| 6,549,793 B1 * | 4/2003 | Baratono | ............... | 455/586.2 |
| 2001/0007086 A1 | 7/2001 | Rogers et al. | | |
| 2001/0045774 A1 | 11/2001 | Rode | | |
| 2001/0055165 A1 | 12/2001 | McCarthy et al. | | |
| 2002/0004702 A1 | 1/2002 | Ruhl | | |
| 2002/0013730 A1 | 1/2002 | Bigus | ............... | 705/15 |
| 2002/0025832 A1 | 2/2002 | Durian et al. | | |
| 2002/0032510 A1 * | 3/2002 | Turnbull et al. | ............... | 701/49 |
| 2002/0049535 A1 | 4/2002 | Rigo et al. | | |
| 2002/0085043 A1 | 7/2002 | Ribak | | |
| 2002/0087238 A1 | 7/2002 | Matsui | | |
| 2002/0138180 A1 | 9/2002 | Hessing et al. | | |
| 2002/0152027 A1 | 10/2002 | Allen | | |
| 2002/0152264 A1 | 10/2002 | Yamasaki | | |
| 2002/0197955 A1 | 12/2002 | Witkowski et al. | | |

FOREIGN PATENT DOCUMENTS

| | | |
|---|---|---|
| DE | 4323144 A1 | 1/1995 |
| DE | 196 29 408 A1 | 1/1998 |
| DE | 19728083 | 2/1999 |
| EP | 0 821 429 A2 | 1/1998 |
| EP | 1 024 626 A1 | 8/2000 |
| EP | 1 043 179 A2 | 10/2000 |
| EP | 1 216 900 A1 | 6/2002 |
| GB | 2 296 157 A | 6/1996 |
| WO | WO98/04051 A1 | 1/1998 |
| WO | WO98/25248 | 6/1998 |
| WO | WO 00/51293 A1 | 8/2000 |
| WO | WO 00/72463 A2 | 11/2000 |
| WO | WO 01/82532 A1 | 11/2001 |
| WO | WO 01/86881 A2 | 11/2001 |

OTHER PUBLICATIONS

Haartsen, "Bluetooth-The universal radio interface for ad hoc, wireless connectivity", Ericsson Review No. 3, 1998, pp. 110-117.

Bennett F. et al.: "Piconet: Embedded Mobile Networking", IEEE Personal Communications, IEEE Communications Society, US, vol. 4, No. 5, Oct. 1, 1997, pp. 8-15.

Arfwedson et al., "Ericcson's Bluetooth modules", Ericsson Review Nov. 4, 1999, pp. 198-205.

PCT International Search Report PCT/US00/14692 (WO 00/72463).

PCT International Search Report for International Application No. PCT/US2004/000088, mailed Jun. 8, 2004, (4 pages).

Bluetooth—FAQ (Text Only); May 10, 1999; http://www.bluetooth.com/text/faq/index.asp; printed May 10, 1999; (3 pages).

"Bluetooth Comes of Age at CEBIT . . . "; INCISOR; News From The Bluetooth And Short Range RF Environment; Apr. 1999; (7 pages).

Hendy, Jeremy; "The Bluetooth Standard"; Ten Points To Ponder; Top Ten; www.csdmag.com; May 1999; (p. 13).

Ohr, Stephan; Harris, National, "Philips tip 2.4-GHz devices as HomeRF spec gains stream; Wireless transceivers roll toward home nets"; *NEWS* (2 pages).

"Startup pins success on Bluetooth wireless"; (1 page).

Ohr, Stephan; "Pushes wireless standard, aims for $10 price tag"; "Ericsson's transceiver gives bite to Bluetooth"; Electronic Engineering Times; Apr. 19, 1999 (2 pages).

*The Australian,* "Viking chips to rule the radio waves", © 1998 Nationwide News Proprietary Ltd., Sep. 15, 1998 (3 pgs.).

Chinnock, Chris, "Car PCs out for a test drive only", *Electronic Buyers'News,* Copyright © 1998 CMP Media LLC, Nov. 16, 1998 (3 pgs.).

*Digital Cellular Report,* vol. 4, Issue: 11, "New Standard for Wireless Data", © 1998 Phillips Business Information, Inc., Jun. 4, 1998 (1 pg.).

Haartsen, Jaap, "Bluetooth-The universal radio interface for *ad hoc,* wireless connectivity", *Ericsson Review,* No. 3, 1998 (pp. 110-117).

Lienert, "Phone Users Will Love New DaimlerChrysler feature; UConnect, voice-activated communication system, gives drivers high-tech convenience," *The Detroit News,* Aug. 13, 2003, p. 3G.

Rothman, "Just Click on 'Decaf'; Get ready for a fresh crop of cool gadgets—from Internet ready coffee machines to protable video players to dolls powered by the latest robotics," *Time Magazine,* Sep. 8, 2003, p. 70.

* cited by examiner

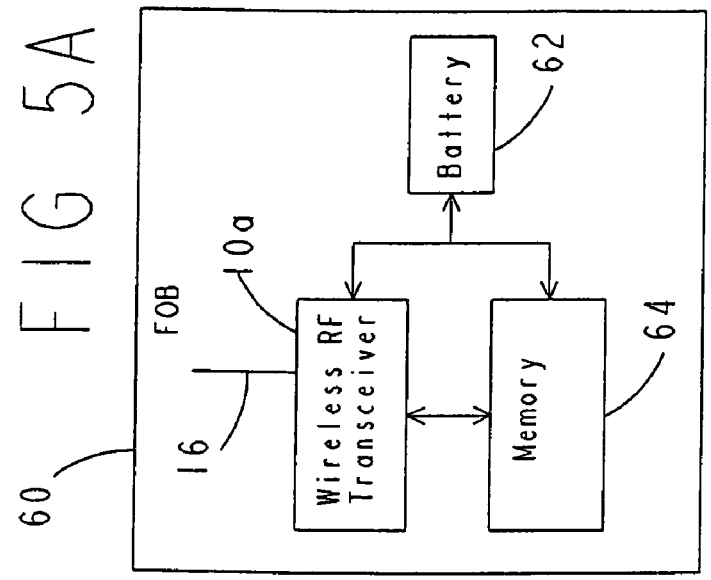
FIG 5
FIG 5A

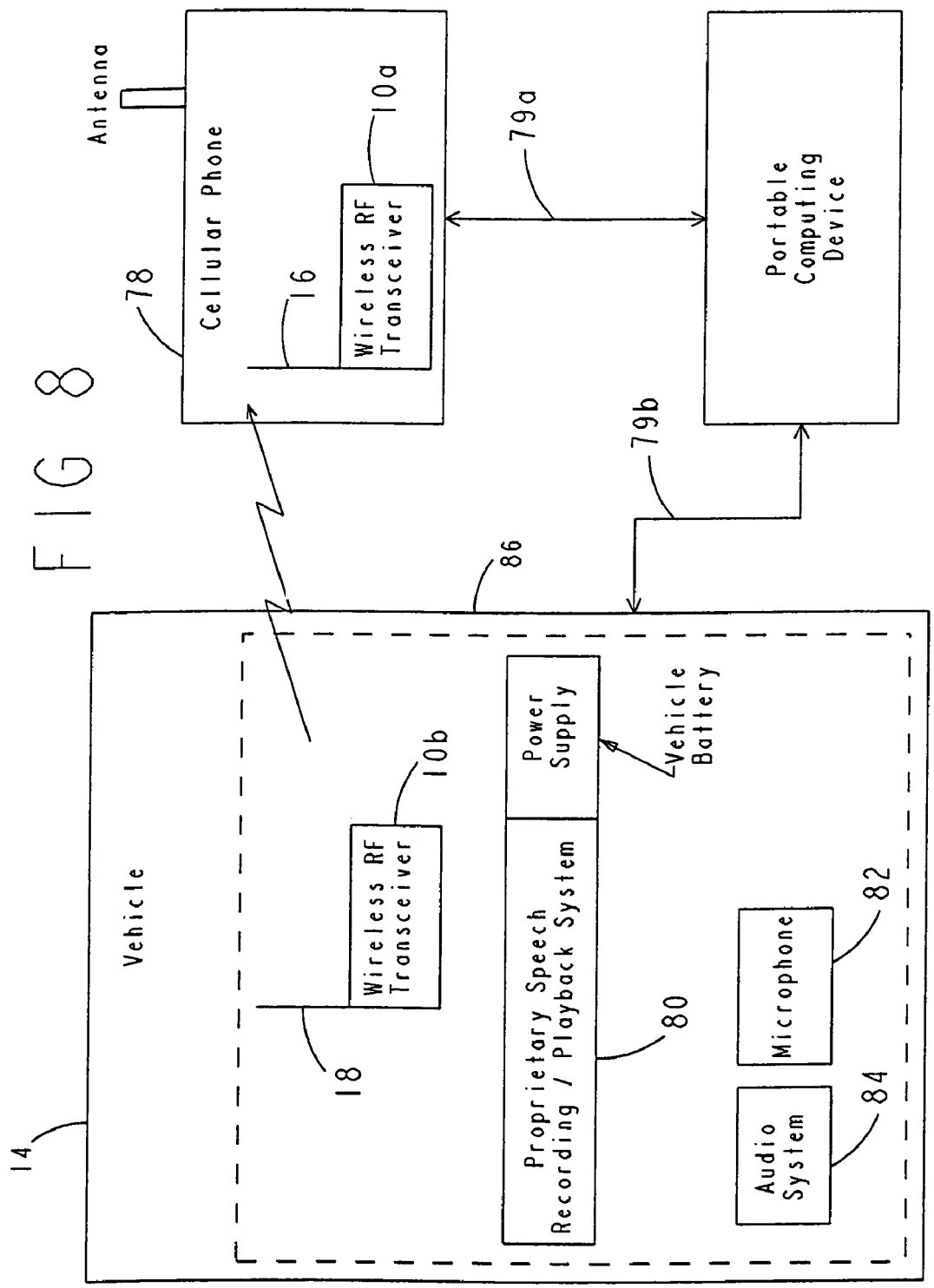

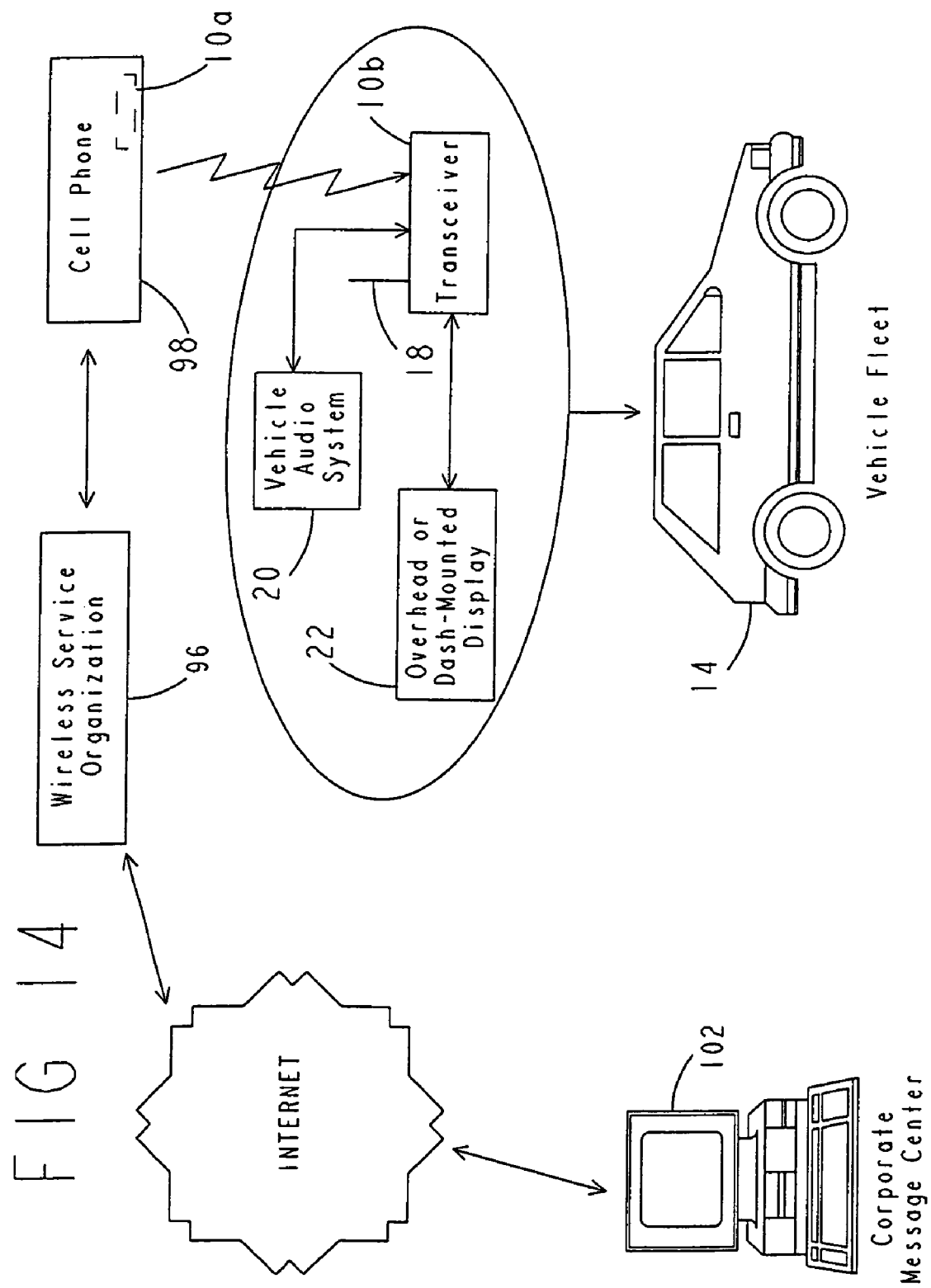

WIRELESS COMMUNICATIONS SYSTEMS AND METHOD

CROSS-REFERENCE TO RELATED APPLICATION

This application claims the benefit of U.S. Provisional Application No. 60/135,979, filed May 26, 1999.

BACKGROUND OF THE INVENTION

This invention relates to wireless communications devices, and more particularly to a wireless communications system and method which facilitates an automatic wireless connection and wireless communication of voice and/or data information between various electronic components such as notebook computers, cellular telephones, hand held computing devices, pagers, audio devices, display terminals and other electronic systems.

With the dramatically increasing popularity of various personal electronic information and computing devices, there has been an increasing need to conveniently integrate the operation, and more specifically the transfer of information, between one or more of such devices. These electronic devices may include notebook computers, desktop computers, hand-held computing/organizer devices often termed "personal digital assistants" ("PDAs"), cellular phones, pagers, audio systems, display devices, cordless headsets, digital cameras and virtually any other electronic or electromechanical device that use electronic information for its operation.

In many environments, such as within an automobile, it would be highly desirable to be able to communicate voice and/or data in wireless fashion between various subsystems of the vehicle, such as an overhead display subsystem of the vehicle, and a cellular phone, notebook computer, PDA, pager or other personal electronic device which is carried on the person of an individual. The ability to transfer information between various subsystems of the vehicle and the user's personal electronic devices, in wireless fashion, would greatly increase the ease and convenience of use of such personal devices when travelling in the vehicle.

Until the present, transferring information between one or more of these devices has most often required that specific cabling be connected between the devices. Usually the cabling is "application specific", meaning that the cabling used to connect, for example, a notebook computer and a hand-held PDA, is specifically designed for only these two components. Thus, the same communications cabling needed for connecting two specific electronic components often can only be used to connect those two components, and not to connect different combinations of other electronic components. Thus, interconnecting different combinations of electronic devices for intercommunication is often possible only with specific and often expensive cabling.

Communication between more than two electronic devices at one time via cabling presents even greater difficulty. Usually some form of hub or "T" connector, together with a mechanical switch and a suitable plurality of external cables is needed. Thus, the user often has very limited flexibility in linking more than two electronic devices together for communication.

In certain environments, such as within an automobile, it is often impractical for the user to manually connect and disconnect cabling between two or more electronic devices, especially when the electronic devices are portable devices which the user desires to carry with her when leaving the vehicle. Additionally, it would be extremely impractical to attempt to connect such personal electronic devices to existing subsystems of a vehicle, such as an overhead display console, with physical cables that would be loose within the vehicle. Such cabling could easily interfere with the driver's convenient operation of the various controls of the vehicle or with the comfort and convenience of other passengers in the vehicle.

In some instances wireless communications, such as by infrared or radio frequency (ARF@) signals, have been used to permit communications and information sharing between two electronic devices. However, previously developed implementations of these methods of information transfer have suffered from significant drawbacks. For example, infrared data transmission requires a "line of sight" between the communicating sensors of the two devices. Such a line of sight is often not practical and/or difficult to maintain in certain operating environments, such as while travelling in an automobile. This also constrains the use of portable electronic devices to positions where the sensor on the portable device is in the line of sight of the other device with which the portable device is communicating.

Radio frequency data communication has traditionally been hampered by the lack of a standard communications protocol for data transfer which permits data to be transmitted between two or more independent electronic devices. A further limitation with RF data transfer systems has been the lack of a low cost, low power RF transceiver able to be inexpensively integrated with compact, portable electronic devices such as notebook computers, cellular telephones, hand-held PDAs, pagers, etc., to enable convenient RF information transfer between two or more of such devices over short distances of up to, for example, about ten meters.

Still another limitation with traditional methods for transmitting data between electronic devices has been the lack of an "automatic" or "unconscious" connection when the devices are in proximity with one another. By "automatic" or "unconscious" it is meant an immediate communications link which is established between two or more electronic devices as soon as the devices are within a certain range, for example, ten meters, of each other without any command being input to any of the devices by the user. This limitation has up until the present required the user to provide one or more commands to at least one of the electronic devices to begin the process of transferring data between the two devices.

In view of the foregoing, it would therefore be desirable to provide a wireless communications system adapted for use in automotive applications to permit the wireless exchange of voice and/or data between various portable electronic devices and various electronic subsystems of a motor vehicle. Such a system would preferably include a first electronic component which could be readily integrated with a wide variety of electronic devices such as notebook computers, pagers, PDAs, cellular phones, etc., and a second component which could easily be integrated with various electronic subsystems of a motor vehicle such as an audio system, microphone, in-dash or overhead display system, on-board navigation system, etc. The first and second components would also preferably be extremely compact, lightweight, have low power requirements, and would therefore be very easily integrated into the various portable electronic devices described above, as well as into the various electronic subsystems of the vehicle. The components would preferably be able to automatically establish a wireless communications link as soon as the electronic device incorporating the first component comes into proximity with the vehicle, where the vehicle incorporates the second component. Such a system would completely obviate the need for any external cables to be attached between the electronic device(s) and the subsystem(s) of the vehicle.

Another example of an application where such a system would be highly useful is in the manufacturing of an automobile. If pertinent information concerning one or more of the vehicle's components or electronic subsystems could be quickly and automatically accessed and transmitted, via a high speed wireless communications link, to an electronic diagnostic/verification test system stationed along side an assembly line on which the vehicle is moving, then real time verification tests could be performed on the various electronic subsystems of the vehicle as it being manufactured. Such automatically created wireless communications links would significantly enhance a wide range of other applications.

Furthermore, it would be highly desirable if such a wireless communications system could be provided which does not add appreciably to the overall costs of such portable electronic devices or to the costs of various electronic subsystems of the vehicle. Preferably, the system would provide a manner of transmission that also ensures very secure wireless transmissions to limit the possibility of the devices being susceptible to electronic "eavesdropping" or the data being intercepted by other RF devices operating in the same frequency spectrum.

SUMMARY OF THE INVENTION

The present invention is directed broadly to a wireless communications system and method for transmitting information between two or more electronic devices. In one preferred embodiment a miniature RF transceiver is integrated into each electronic device. The RF transceivers are low power, short range transceivers that enable the exchange of voice and/or data information between the two devices. The wireless communications link between the devices is established automatically when the devices come within a predetermined proximity to each other. Thus, information can be transmitted automatically from one device to the other without any action from an individual monitoring or possessing one of the devices and without the user having to connect one or more external cables between the devices.

In one preferred embodiment the present invention makes use of the Bluetooth communications standard for establishing a wireless communications link between two devices, where each device is equipped with a RF transceiver operating in accordance with the Bluetooth communications standard. This enables two or more devices to be connected via high speed, wireless communications links to permit voice and/or data information to be exchanged between the various devices. The devices communicate on the 2.4 GHz ISM frequency band and employ encryption and authentication schemes, in addition to frequency hopping, to provide a high measure of security to the transmission of data between the devices. Advantageously, the wireless communications link is created automatically as soon as the two devices come into proximity with each other.

In each embodiment of the present invention, the RF transceivers each comprise low power components providing a limited range of up to about 100 meters. Each RF transceiver has a negligible power consumption, as compared with the device with which it is integrated. Each RF transceiver can automatically form ad hoc communications links with other RF transceivers passing within the predetermined transmission range.

The various preferred embodiments of the present invention enable voice and/or data information to be transmitted between a wide variety of devices without any command or intervention by the user. The preferred embodiments lend themselves especially well to applications involving the transfer of information between various portable electronic devices and the various electronic subsystems of a motor vehicle. The preferred embodiments further enable the transfer of information between a motor vehicle and other electronic systems outside of the vehicle, which makes the present invention ideally suited to applications involving assembly of the vehicle, assisting in transmitting diagnostic information to and from a vehicle, and a wide variety of other applications where it is desirable to transmit information to a user traveling in a motor vehicle.

The various preferred embodiments are also ideally suited to establishing wireless communications links for a wide variety of other home, business, and commercial applications. A wide variety of electronic devices can thus be networked together for information sharing.

BRIEF DESCRIPTION OF THE DRAWINGS

The various advantages of the present invention will become apparent to one skilled in the art by reading the following specification and by referencing the following drawings in which:

FIG. 5 is a block diagram of the wireless communications system being used in connection with a key FOB to enable data to be transmitted from the key FOB to a vehicle bus interface of a motor vehicle to control various subsystems of the vehicle;

FIG. 5A is a block diagram of the major components of the key FOB of FIG. 5;

FIG. 8 is a block diagram of the present invention being used to create a wireless communications link between a cellular phone and a proprietary voice recording/playback system manufactured by the assignee of the present application and presently used on motor vehicles;

FIG. 14 is a block diagram of the wireless communications system of the present invention being used to transmit corporate information or messages from a wireless service organization to a fleet vehicle, where the information is provided over the Internet from a corporate computer system, and such that the information can be provided via a wireless data link directly to the various subsystems of a fleet vehicle.

DETAILED DESCRIPTION OF THE PREFERRED EMBODIMENTS

Figure 1:
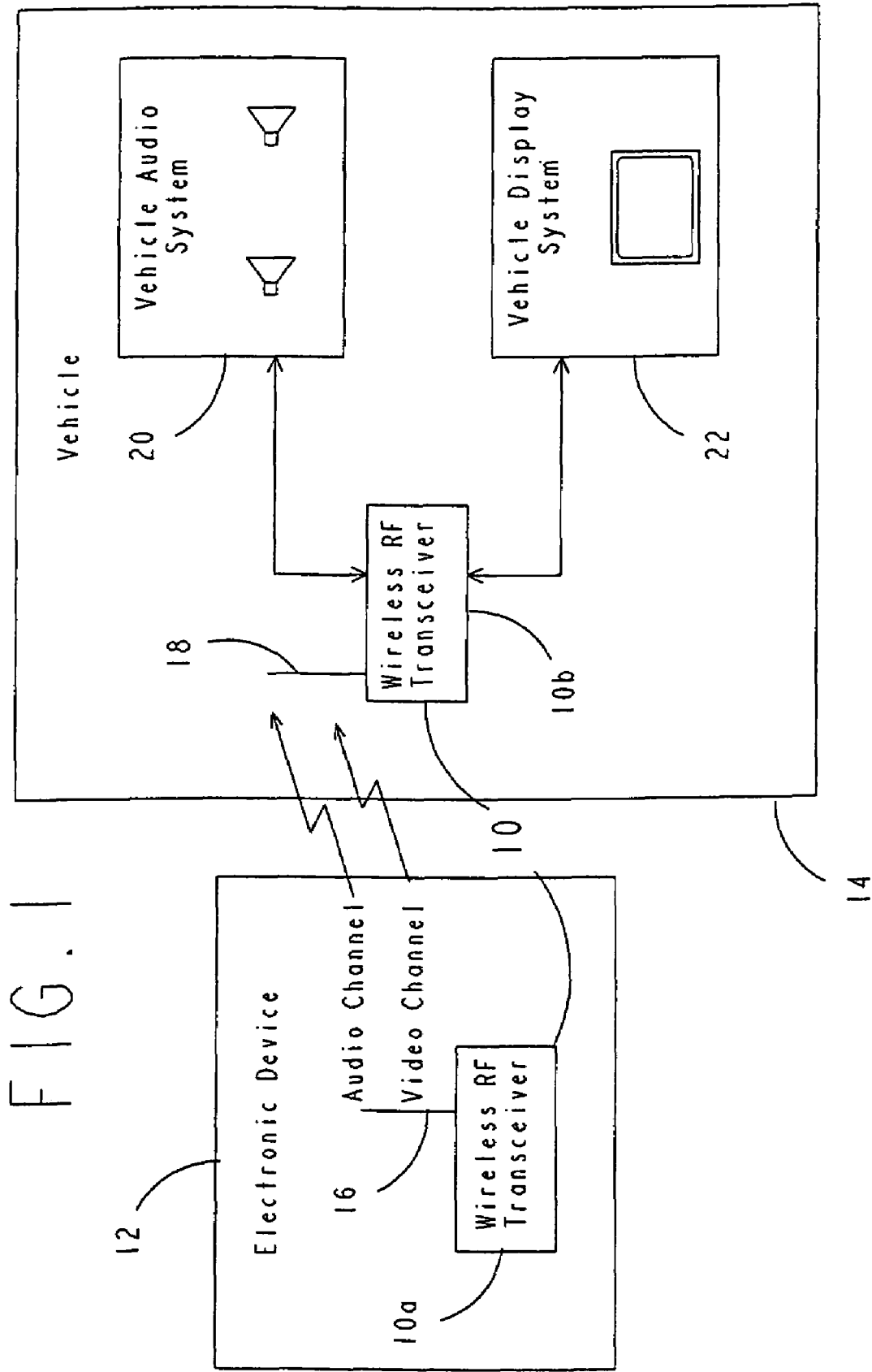
FIG. 1 is a block diagram drawing of a wireless communications system in accordance with a preferred embodiment of the present invention being used to transfer information between an electronic device of the user and an audio system and a display system of a motor vehicle.

Referring to FIG. 1, a wireless communications system 10 in accordance with a preferred embodiment of the present invention is illustrated. The present invention is broadly directed to a wireless communications system 10 in which at least one pair of RF transceivers 10*a* and 10*b* are used to create a wireless communications link between at least two independent electronic devices. Each RF transceiver 10*a* and 10*b* operates in accordance with a suitable wireless communications protocol or standard to enable wireless communications between the transceivers 10*a* and 10*b*. The specific protocol or standard used also preferably enables the wireless communications link to be established automatically when the two RF transceivers come into proximity with each other. The specific protocol or standard may be the Bluetooth communications standard or the Shared Wireless Access Protocol-Cordless Access (SWAP-CA) specification, or any other suitable wireless communications specification that enables voice and/or data information to be transmitted between the two RF transceivers 10*a* and 10*b*.

The Bluetooth communications standard was established for creating small form factor, low-cost, short range RF links between mobile telephones, notebook computers, PDAs and other portable electronic devices. It is the result of a joint effort between several major commercial organizations to develop a RF communications standard for creating secure, wireless communications links between portable electronic devices such as cellular phones, PDAs, computers and other electronic devices. The Bluetooth communications standard is presently an "open" standard that enables short range, secure, RF transmission of voice and/or data information between such portable electronic devices to thus eliminate the need for physical cables for interconnecting the devices. Its implementation is based on a high performance, but low cost, integrated RF transceiver chip set. The Bluetooth standard further provides the potential for automatic and rapid "ad hoc" wireless connections when two or more devices equipped with RF transceivers operating in accordance with the Bluetooth standard come into proximity with each other.

The Bluetooth standard makes use of the free, universal 2.4 GHz Industrial, Scientific, and Medical (ISM) band and a frequency hopping scheme using 1600 hops/second. Encryption and authentication are built into the Bluetooth standard along with an automatic "output power adaption" feature that automatically reduces the output power of the RF transceiver to only (and exactly) that amount of power which is needed to accomplish the data transmission.

The Bluetooth standard specifies a minimum RF receiver sensitivity of −70 dBm and the nominal output power is specified as 0 dBm (i.e., 1 mW), which eliminates the need for an off-chip power amplifier. With a 0 dBm transmit power, the typical range for the RF transceiver is up to about 10 meters. The range can be extended to about 100 meters by augmenting the RF transceiver chip set with an external power amplifier to increase the transmit power to a maximum of 20 dBm. The maximum data transfer rate between two Bluetooth transceivers is slightly under 1 Mbits/sec. The data rate for a voice channel is 64 kbits/sec (GSM-13 kbits/sec). A suitable RF transceiver for use with the Bluetooth standard can be formed relatively inexpensively as a single CMOS integrated chip. As such, the RF transceiver can be manufactured sufficiently small such that it can be readily incorporated into virtually all portable electronic devices without adding appreciably to the size, cost, weight and power consumption of such devices. Additional information on the Bluetooth standard can be obtained at URL address www.bluetooth.com.

Advantageously, the Bluetooth standard presently supports wireless communications networks termed "piconets" of between two to eight devices actively communicating with each other. Additional devices can be "parked" and accessed as needed. Within a piconet, one of the devices acts as the "master" device, which determines the frequency hopping pattern, packet timing, and which coordinates transmissions to the other "slave" devices. The slave devices can also be members of more than one piconet at a time, thus forming an ad hoc arrangement of multiple piconets termed a "scatternet". Thus, networked communication of notebook computers, PDAs, mobile phones, and other devices are provided for with the Bluetooth standard.

The SWAP-CA specification is another wireless communications standard that potentially could be employed by the RF transceivers 10a and 10b. The SWAP-CA specification also is intended to use integrated transceivers on a 2.4 GHz frequency hopping scheme for wireless communications between various products and appliances used in homes. With this standard, the data transfer rate for information is 2 Mbits/sec.

Accordingly, while the Bluetooth or SWAP-CA specifications may be referenced throughout the discussion of the various preferred embodiments, the present invention should be understood as not being limited to the use of one or the other of these specifications, or necessarily to any specific communications specification.

In FIG. 1, one RF transceiver 10a is integrated into a first electronic device 12 while the other RF transceiver 10b is disposed within a motor vehicle 14. The electronic device 12 may comprise a notebook computer, a hand-held PDA, a cellular phone, a pager, or any other portable electronic component. The first RF transceiver 10a includes an antenna 16 for enabling two way communications with the RF transceiver 10a. Likewise, the second RF transceiver 10b also includes its own antenna 18 for enabling two way communications. The vehicle 14 typically includes an audio system 20 and a display system 22. The display system 22 may be mounted in a dashboard, an overhead console, a floor mounted console, a visor, a rear view mirror or at a wide variety of other locations inside the vehicle 14. The display 22 may comprise a small cathode ray tube ("CRT"), a liquid crystal display ("LCD") or various other forms of displays which are easily visible in daytime as well as nighttime driving conditions.

Each of the RF transceivers 10a and 10b are preferably formed as integrated circuit components which have an extremely low power consumption relative to the device with which they are integrated. Accordingly, the RF transceivers 10a and 10b can be maintained in an "on" state even when the electronic device with which it is associated is turned off. The RF transceivers 10a and 10b are further extremely compact and relatively inexpensive such that the overall dimensions of the electronic device are not appreciably increased by the inclusion of one of the transceivers 10a or 10b, and further such that the overall cost of the electronic device does not increase appreciably.

In FIG. 1, when the electronic device 12 comes into the vicinity of the vehicle 14, a high speed, automatic, wireless data link is created between the two RF transceivers 10a and 10b. The required proximity will vary depending upon the power output of each transceiver 10a and 10b. For a 0 dBm (1 mW) power output, a transmission range of up to about 10 meters is provided. Providing a suitable external amplifier to increase the output power of each RF transceiver 10a or 10b to a maximum of 20 dBm will increase the transmission range up to about 100 meters. It will be appreciated, however, that with even greater power amplifiers an even greater transmission range can be expected. Currently, the Bluetooth standard identifies a 20 dBm maximum power output.

Once the wireless communications link is established between the two RF transceivers 10a and 10b, information from the electronic device 12 can be transmitted to transceiver 10b and then output to the vehicle's audio system 20 and/or to the display system 22. Thus, the user is not required to type in or otherwise give any commands to the electronic device 12 before the wireless communications link is established. Once established, the communications link enables information from the electronic device 12 to be automatically transmitted via RF transceiver 10a to the receiving RF transceiver 10b. In this manner, a wide variety of useful information such as personal calendars, e-mail messages, telephone directories, and virtually any other form of text information can be displayed on the vehicle's display system 22. If an external "text-to-speech" module is incorporated for operation with the second RF transceiver 10b, then text information can be converted into audio before being transmitted to the vehicle's audio system 20 for playback. Thus, if the electronic device 12 comprises a notebook computer with a CD player, any information available on the CD can potentially be converted to speech via the external text-to-speech module and the vehicle's audio system 20. Thus, a wide variety of CD-based or Internet-based audio material such as books, educational materials, etc. could be played over the vehicle's audio system 20 while the user is in the vehicle 14.

Vehicle Diagnostics Implementation

Figure 2:
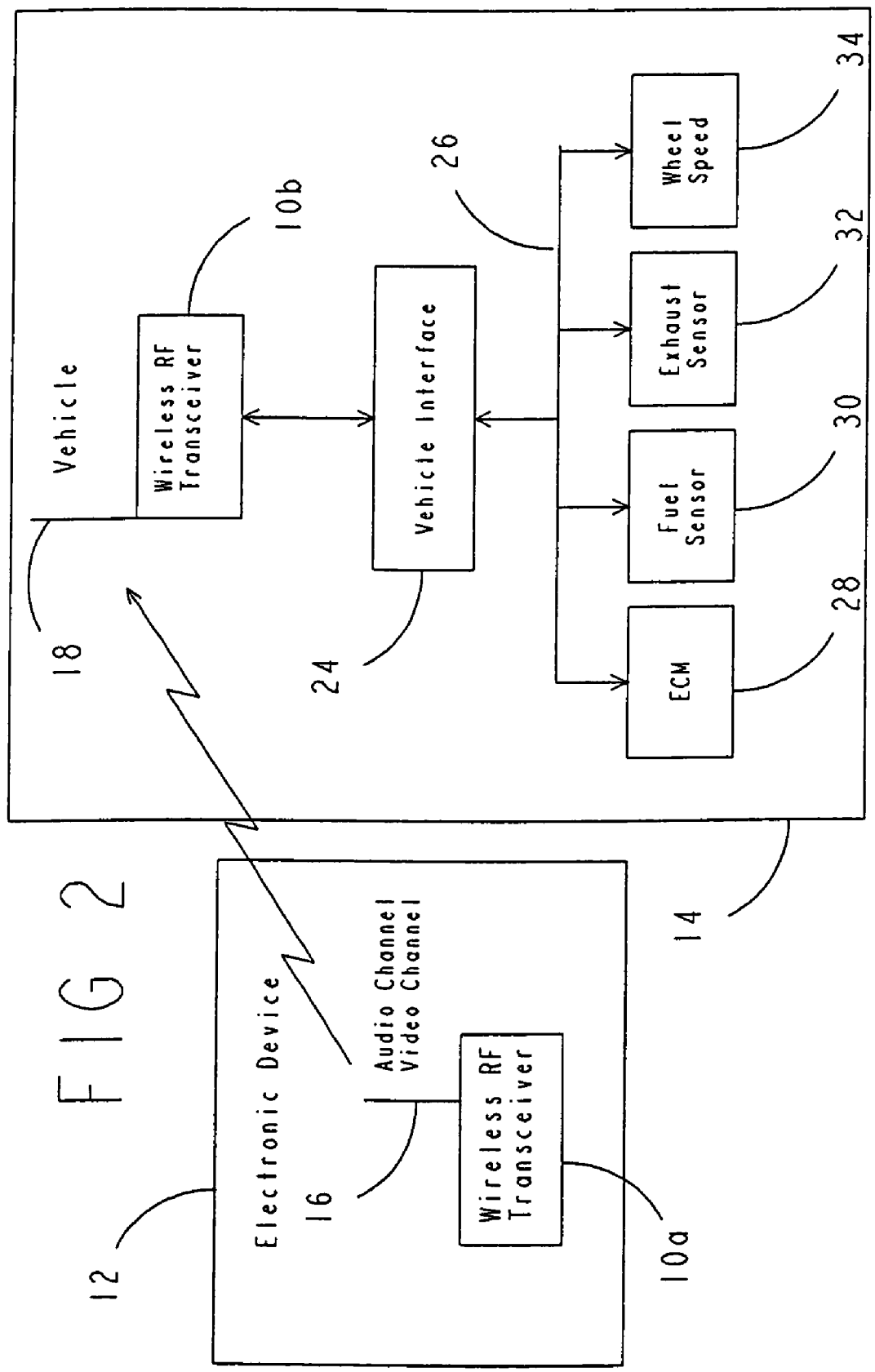
FIG. 2 is a block diagram illustrating the wireless communications system of the present invention being used to perform vehicle diagnostics on a motor vehicle by creating a wireless communications link between a notebook computer running diagnostics software and a vehicle interface circuit associated with a motor vehicle.

Referring to FIG. 2, another implementation of the wireless communications system 10 of the present invention is shown. This implementation is used to facilitate performing diagnostics on a motor vehicle 14 via the electronic device 12. In this example, the electronic device may comprise a notebook computer or other electronic instrument loaded with diagnostic software specifically suited to the vehicle being tested. The first RF transceiver 10a is integrated into the electronic device 12 and the second RF transceiver 10b is integrated for communications with a vehicle interface system 24. The vehicle interface system 24 is in turn coupled for two way communications via a data bus 26 with various electronic subsystems of the vehicle 14 such as the vehicle's Electronic Control Module (ECM) 28, a fuel sensor 30, an exhaust sensor 32, a wheel speed sensor 34 or virtually any other form of sensor which provides an electronic output signal related to its operation.

The wireless data link may be created automatically as soon as the vehicle 14 enters a service bay or other designated service area. The first RF transceiver 10a automatically begins transmitting diagnostics information stored in an associated memory (not shown) to the second RF transceiver 10b to begin the diagnostics testing. Information is transmitted back to the first transceiver 10a by the second transceiver 10b as information is received from the vehicle interface 24 from each of the sensors/components 28-34 under test. This information is then used by service personnel to determine the operational status of each of the sensors/components 28-34 on-board the vehicle 14. While the electronic device 12 has been described as a notebook computer, it will also be appreciated that the device 12 could just as readily comprise a personal computer or other form of non-portable computer adapted to run the diagnostics software.

It will be appreciated that the automatic wireless communications link enables various diagnostics to be performed on a motor vehicle even while other operations, for example, an oil change, are being performed simultaneously with the running of the diagnostics. This implementation can significantly reduce the manpower required to perform various service-related operations on a motor vehicle as well as decrease the length of time needed to perform a full service checkup/tuneup on a vehicle when the vehicle is brought in for routine maintenance such as oil changes, wheel alignments, air and fuel filter changes, wheel balancing, etc.

Implementation Involving a Vehicle Assembly Operation

Figure 3:
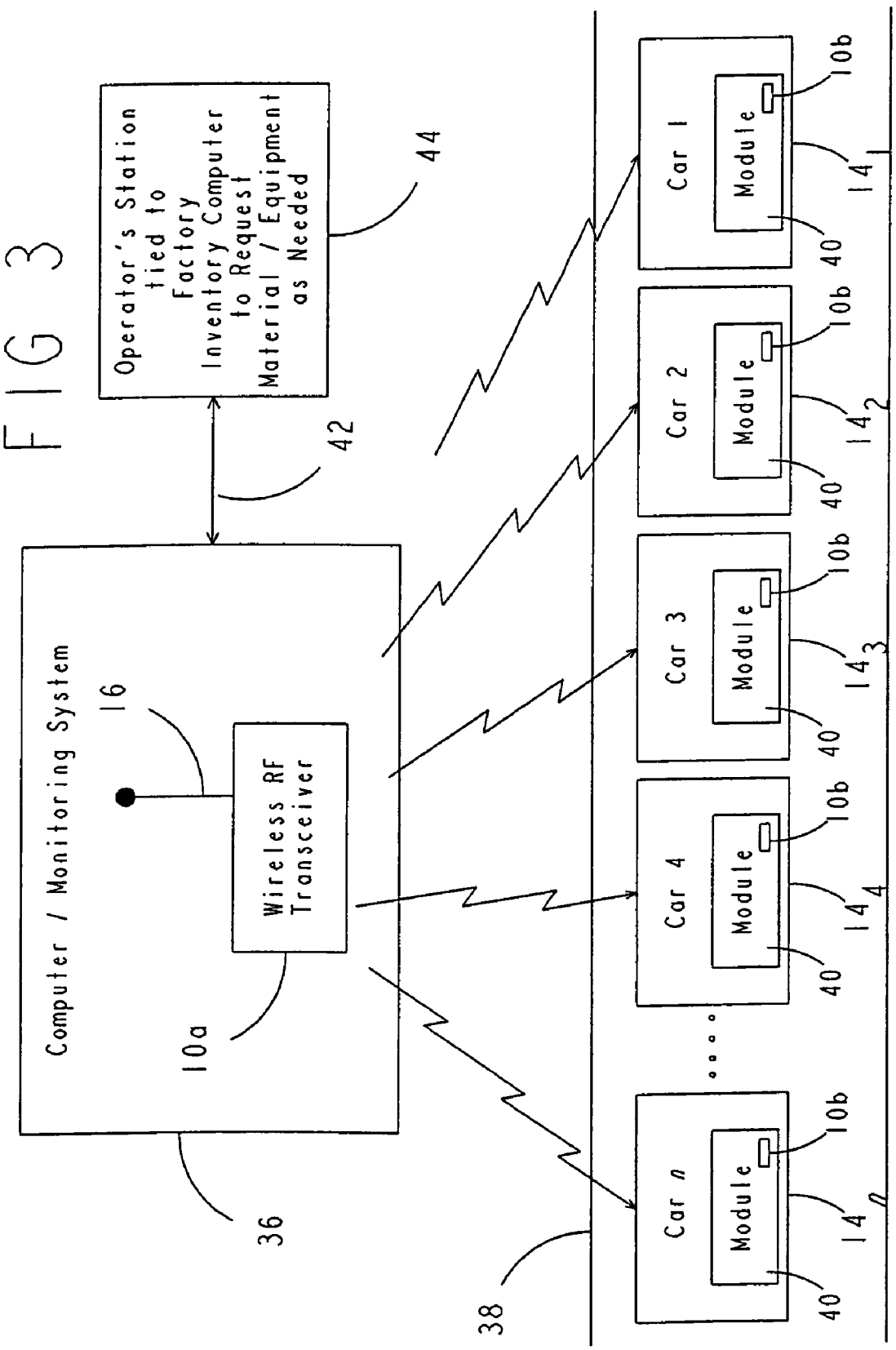
FIG. 3 is a block diagram of the wireless communications system of the present invention being used in an assembly operation in which information is transmitted from RF transceivers located in each vehicle to an assembly line monitoring system such that information needed for the manufacture of each vehicle can be requested in advance and thereafter made ready as needed during assembly of the vehicle.

Referring now to FIG. 3, an implementation of the wireless communications system 10 is shown being used in the assembly process of a motor vehicle. In this implementation, the first RF transceiver 10a of the system 10 is integrated with an assembly line computer/monitoring system 36. Each one of a plurality of vehicles 14'-14n traveling on assembly line conveyor 38 includes a module 40 having the second RF transceiver 10b integrated therewith. The module 40 can be programmed to include information regarding the specific options that its associated vehicle 14 is to include. Such options could comprise the type of interior, audio system options, interior trim package, powertrain options or any other equipment that will be needed to complete the manufacture of that particular vehicle 14.

As each vehicle 14'-14n moves along the assembly line conveyor 38 into proximity with the computer/monitoring system 36, an automatic wireless communications link is established between each RF transceiver 10b, one at a time, and the RF transceiver 10a of the computer monitoring system 36. Information regarding the options that each particular vehicle $14_1$-$14_n$ is to include is then transmitted via the wireless communications link to the computer/monitoring system 36, which in turn is transmitted over a communications link 42 to an inventory management computer 44. It will be appreciated that the communications link 42 could be a wire-based link or could even be formed by an additional pair of RF transceivers in accordance with the teachings of the present invention to form a second wireless link. The only limitation here would be the distance to the inventory computer system 44 from the assembly/monitoring computer system 36.

The above-described implementation enables the wireless communications system 10 to thus be used to synchronize the supply of needed equipment and materials to each vehicle $14_1$-$14_n$ moving on the assembly line conveyor 38 to ensure that exactly the proper equipment is provided for each vehicle.

It will also be appreciated that the implementations described in connection with FIGS. 2 and 3 could be combined to enable various electronic modules and subsystems of the vehicle to be tested immediately as the vehicle moves along the assembly line conveyor 38. This feature would enable a vehicle diagnostics computer located adjacent to the assembly line conveyor 38 to run tests on the vehicle's modules and electronic subsystems to detect defective components before the vehicle proceeds to the next step of the assembly process. This feature would save the significant costs associated with manually removing various electronic modules and components from the vehicle for testing and repair when a defective component is detected after assembly of the vehicle is complete.

High Speed Data Link Created for a Retail Transaction

Figure 4:
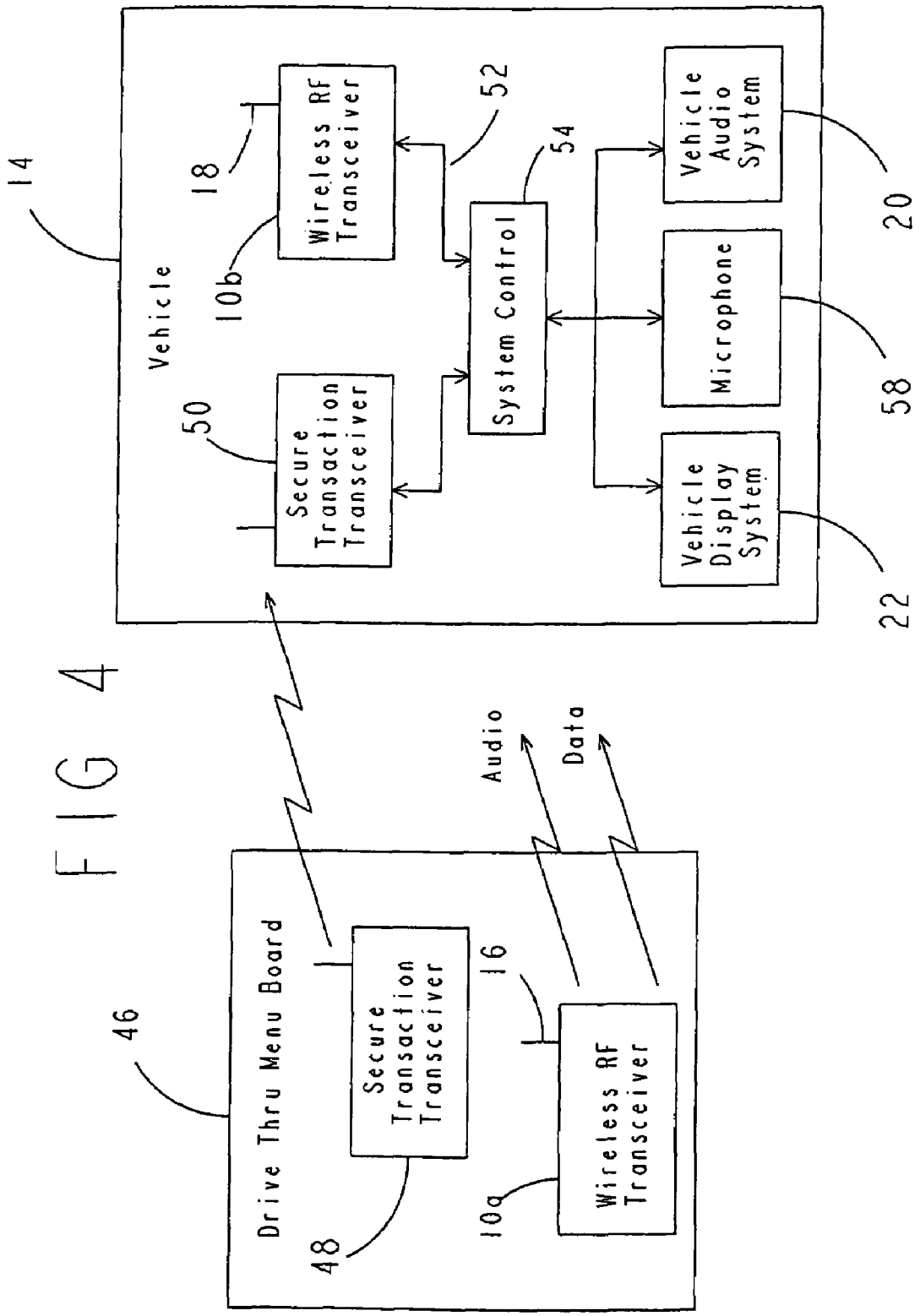
FIG. 4 is a block diagram of the wireless communications system being used to create a high speed data link between a drive-through restaurant menu and the various electronic subsystems of the motor vehicle to enable information from the drive through menu to be broadcast and/or displayed by the vehicle's electronic subsystems.

Referring now to FIG. 4, yet another implementation of the wireless communications system 10 is illustrated. This implementation is in connection with a retail transaction in which a drive-through menu board 46 has a first RF transceiver 10a of the wireless communications system 10, in addition to a secure transaction RF transceiver 48, integrated therewith. The vehicle includes the second RF transceiver 10b in addition to a secure transaction transceiver 50. As the vehicle 14 approaches the drive-through menu board 46, the RF transceivers 10a and 10b automatically establish a high-speed wireless communications link. A secure datalink is established between transceivers 48 and 50 by which electronic payment can be authorized by the driver of the vehicle 14. Menu information is then automatically downloaded over the high-speed communications link between the RF transceivers 10a and 10b onto a system control device 50. The system control device 50 acts as an interface to transmit the information to the vehicle's display system 22 and/or the vehicle's audio system 20 for playback. If a suitable microphone 58 is provided in the vehicle 14, authorization for the transaction may be provided verbally by the driver and transmitted via the communications link between the secure transaction transceivers 48 and 50 back to the drive-through menu board 46.

It will be appreciated that the above-described implementation could be modified to enable drive-through banking transactions, drive-through prescription ordering or a wide variety of other retail transactions made from within a vehicle without the need for the driver to leave the vehicle 14 to effect the transaction. Other applications could include toll collecting, fuel purchases at service stations and other transactions that could potentially be made more conveniently and more quickly by the use of the wireless communications system 10 of the present invention.

Key Fob Communicating with a Vehicle

Referring to FIG. 5, an implementation involving a programmable key FOB 60 is illustrated for setting and adjusting various components of the vehicle 14. The key FOB 60 is shown in greater detail in FIG. 5A and includes the first RF transceiver 10a of the wireless communications system 10, the antenna 16, a suitable battery 62 for providing power and a suitable memory 64. The second RF transceiver 10b of the system 10 is integrated into the vehicle electronics to communicate with the vehicle bus interface 24 via the vehicle bus 26, and further with various modules 66-72 for controlling various components of the vehicle 14.

As the user approaches the vehicle 14 when carrying the key FOB 60, a high speed, wireless communications link is automatically established between the two RF transceivers 10a and 10b. Information stored in the memory 64 of the key FOB 60 is then transmitted to the second transceiver 10b and used to control various modules of the vehicle 14 in accordance with preprogrammed settings by the user. Thus, information relating to the precise position of a power seat, volume and channel information of the radio 72, climate control information for the HVAC 70, rearview mirror or external mirror position information, etc., can all be stored in the memory 64 and automatically transmitted to the vehicle 14 as the user approaches the vehicle. The seats of the vehicle 14, climate control settings, radio channel and volume settings, mirror positions, etc. can all be automatically adjusted by suitable vehicle electronics even before the user enters the vehicle 14.

Key Fob Communicating with Work and Home PCs

Figure 6:
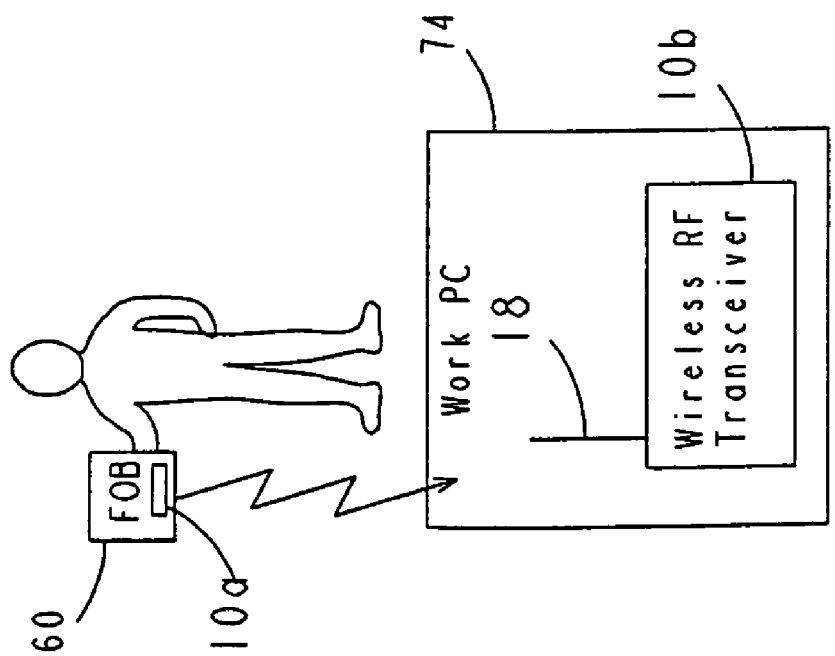
FIG. 6 is a block diagram drawing illustrating a wireless communications link created between a key FOB carried by the user and a work PC to enable data files to be transmitted in wireless fashion between the PC and the key FOB.

Referring to FIG. 6, another implementation of the wireless communications system 10 using the programmable key FOB 60 is illustrated. In this implementation the key FOB 60 is used to interrogate a PC 74 at the user's place of business. Selected files stored on the hard drive or in random access memory (RAM) of the PC 74 can be transmitted via a wireless communications link established between the RF transceiver 10a of the key FOB 60 and the second RF transceiver 10b, which is integrated with the work PC 74. The information is stored in the memory of the key FOB 60 before the user leaves his/her place of business.

Figure 7:
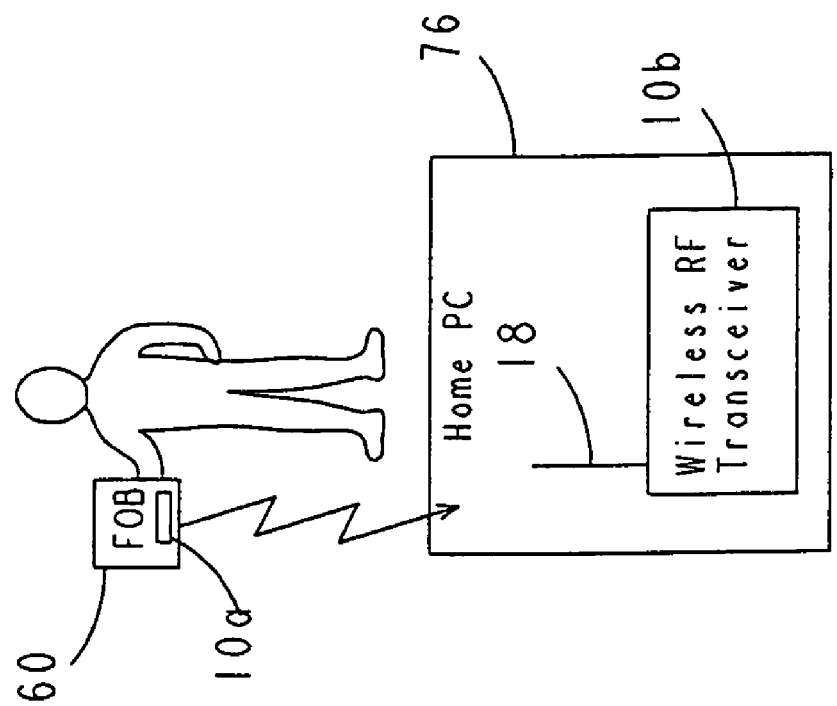
FIG. 7 is a block diagram of the key FOB of FIGS. 5 and 5A being used to transmit files in wireless fashion from the key FOB to a home PC.

Referring to FIG. 7, as the user arrives at his/her home, a home PC 76 is automatically linked with the key FOB 60 by the RF transceiver 10a of the key FOB 60 and a second RF transceiver 10b integrated with the home PC 76. The automatically created wireless communications link is used to transmit information stored in the memory 64 (FIG. 5a) of the key FOB 60 to the individual's home PC 76.

Wireless Speakerphone Using Proprietary Speech Recording/Playback System

Referring now to FIG. 8, yet another implementation of the wireless communications system 10 of the present invention is shown in which a cellular phone 78 is linked with a proprietary speech recording/playback system 80 available commercially from the assignee of the present application and marketed under the trademark "Travelnote®". The Travelnote® system enables the driver or other vehicle occupant to speak directly into a microphone 82 to record any notes or other information which the user would otherwise write down on paper, but which cannot be accomplished easily while driving the vehicle 14. The notes or other information can be played back from the Travelnote® recording/playback system 80 over a speaker 84 once the user reaches his/her destination and prior to exiting the vehicle 14. The Travelnote® recording/playback system 80 is described in detail in U.S. Pat. No. 5,810,420, the disclosure of which is hereby incorporated by reference.

In this implementation, the RF transceiver 10a is integrated with the cellular phone 78 and the second RF transceiver 10b is integrated with the Travelnote® recording/playback system 80. The Travelnote® recording/playback system 80 may be located within a visor or rear view mirror 86. Alternatively, it may be located on the dashboard, overhead console, or any other convenient location within the vehicle 14. The wireless communications system 10 provides a high-speed, wireless communications link between the cellular phone 78 and the Travelnote® recording/playback system 80 to enable "hands free" use of the cellular phone 78. Thus, the user need not hold the cellular phone 78 in one hand while driving; the phone 78 can be placed on a console or seat 82 adjacent to the user while the user carries on a hands-free conversation via the microphone 82 and speaker 84 of the Travelnote®playback/recording system 80.

A further advantage is that the wireless communications link between the RF transceivers 10a and 10b is created automatically when the cellular phone 78 comes into proximity with the second RF transceiver 10b within the vehicle 14. Thus, the user need only dial a number from the cellular phone 78 to place a call and the conversation thereafter can be conducted via the Travelnote® system 80. Alternatively, a call could even be placed via commands and numbers spoken into the microphone 82 and transmitted via the wireless communications link to the cellular phone 78. Useful information received by the cellular phone 78 could even be displayed on a small portion of a rearview mirror. Such information could include auxiliary phone annunciators, a "low battery" warning indicating a low battery power condition for the cellular phone 78 or other incoming call information received via the phone 78.

A modification of this implementation involves modifying the above-described Travelnote® system to send and/or receive digital information such that the Travelnote® system can be used to pass digital information to and from a computing device 79 such as a hand-held computing device or a laptop computer. With this capability, the Travelnote® system could be used to transmit information received by a facsimile transmission or email communications to the computing device. This digital information would be first received by the user's cellular phone 78. Preferably, an infrared communications link 79a is also established by suitable hardware between the cellular phone 78 and the computing device 79. The infrared link is used to transmit digital information between the computing device 79 and the cellular phone 78. Preferably, an infrared link 79b is also established between the Travelnote® system and the computing device 79 so that digital information can just as easily be transmitted directly between the computing device 79 and the Travelnote® system. Messages sent to the Travelnote® system could be stored therein for future downloading to another computer. The computing device 79 could also send stored phone numbers stored to the Travelnote® system to simplify the dialing of phone numbers.

As will be appreciated, other implementations of the present invention could be made in connection with a home and/or vehicle. For example, RF transceiver 10a could be disposed in a cellular phone while RF transceiver 10b is disposed in a Homelink®system which is proprietary to the assignee of the present application. The Homelink® system can be programmed to interface with, for example, a garage door opener to open the garage door when a control unit of the Homelink® system is actuated by a user. By incorporating RF transceiver 10b into the Homelink® system, the user could enter a predetermined code in the cellular phone which is received by the Homelink® system and which causes the Homelink® system to open the garage door. In this manner, if an individual was not in his/her car own vehicle as he/she approached their house, the garage door could still be easily opened without the user having the garage door opener unit.

In another implementation, one or more RF transceivers 10a are used in connection with various devices in a home. A second RF transceiver 10b is placed in a garage. The second transducer 10b serves as a portal from the user's car to those devices in the home that are equipped with RF transceivers 10a. The garage-based RF transceiver 10b is able to interface and interact with those devices incorporating a RF transceiver 10a, such as a home PC, appliances, etc.

In still another implementation, one RF transceiver 10a could be located within a vehicle while a second RF transceiver 10b could be associated with a computer located either at a vehicle dealership or at a home. When a vehicle is manufactured, all parts could be tagged in the plant so it is known which specific parts are installed on the vehicle. This information could be stored in a database stored in a memory device in the car. In addition, warranty information for those parts, as well as for the car as a whole, could be stored in this database.

When the vehicle is in proximity to the first RF transceiver 10a while the vehicle is being serviced at a dealership, service personnel could easily access information stored in the memory device via the wireless link between RF transceivers 10a and 10b. This would provide immediate access to information on the various components of the vehicle, as well as warranty information.

In yet another implementation similar to that described immediately above, only the Vehicle Identification Number ("VIN") is delivered to the computer from the RF transceiver 10b located in the vehicle. The VIN is then used by the computer to access a database which is remote from the vehicle to obtain warranty and part information. It will be appreciated that this information could also be accessed through a web site of the manufacturer of the vehicle.

In still another variation of the above-described implementation, if a cellular telephone is located in the vehicle, and the telephone is equipped with an RF transceiver 10b, then any vehicle malfunctions could be reported to the vehicle manufacturer or dealer via a wireless link established between the computer and the cellular phone. This information can be used to facilitate repair of the vehicle or the tracking of warranty information pertaining to the vehicle.

The computer could also be used to personalize the vehicle operation. For example, the vehicle owner could access a manufacturer's website to select the desired operating parameters for the vehicle. These parameters could include selecting a 12 hour or 24 hour clock time display, establishing station pre-selects for the vehicle radio operation, selecting parameters related to the operation of the vehicle lights, enabling voice interactive messages generated by the vehicle, or a variety of other vehicle operating parameters. Once the operating parameters are selected by the vehicle owner, the website could cause the owner's home computer (which is equipped with RF transceiver 10a) to generate an RF signal that is sensed by the vehicle causing the parameters to be stored in a memory device in the vehicle. Alternatively, a compact disc could be provided to the vehicle owner upon purchase of the vehicle, which can be used with the individual's home computer to personalize the vehicle's functions. This information can then be transferred from the home computer to the vehicle via a wireless link between the two RF transceivers 10a and 10b.

Car to Home Wireless Communications Link

Figure 9:
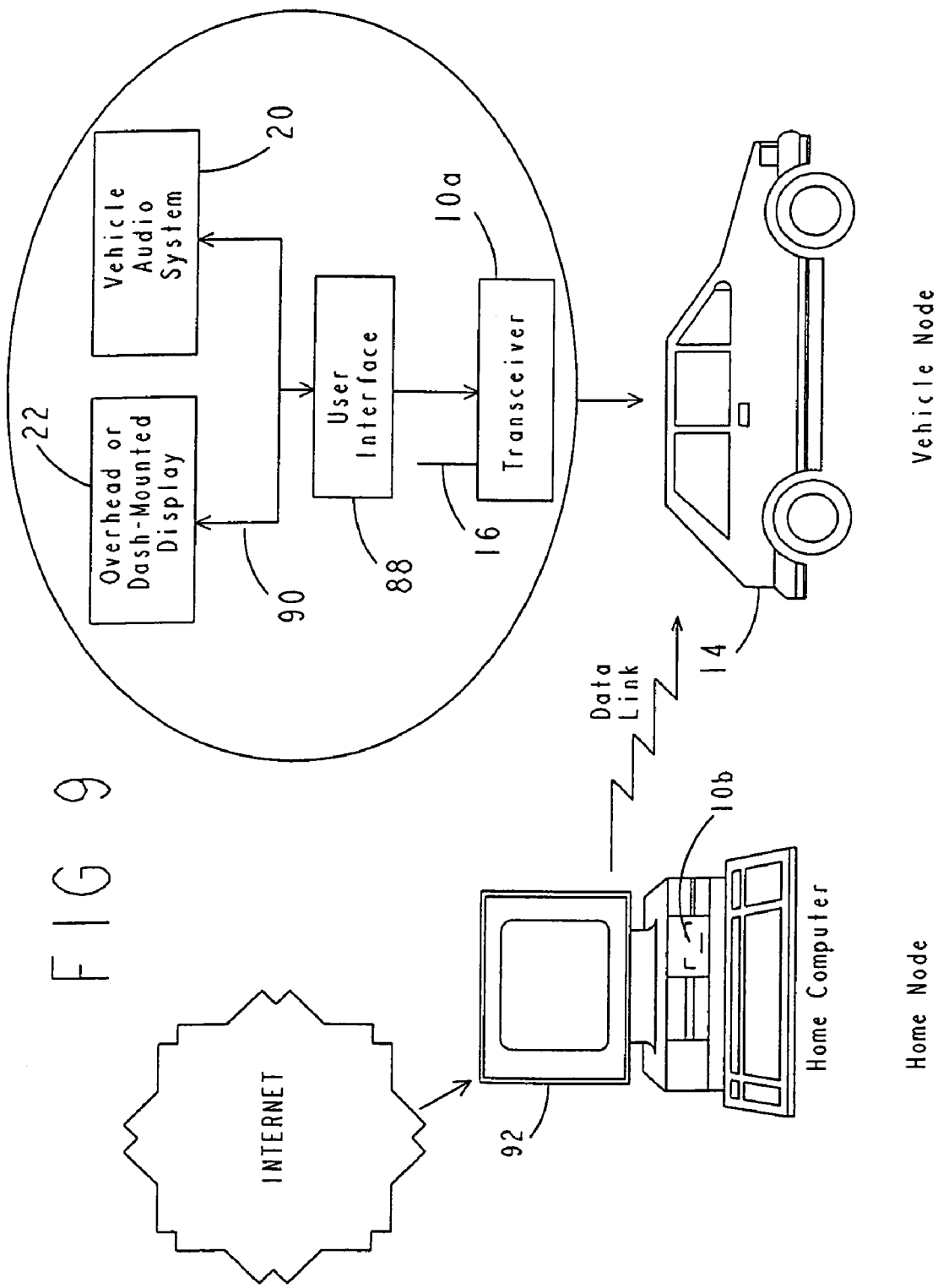
FIG. 9 is a block diagram of the wireless communications system being used to create a wireless data link between a home PC linked to the Internet and various electronic subsystems of a motor vehicle to thereby enable information from the Internet to be transmitted to the subsystems of the vehicle automatically.

Referring to FIG. 9, another implementation of the wireless communications system 10 is shown in which the system 10 includes the first RF transceiver 10a in communication with a user interface circuit 88. The user interface circuit 88 is in turn linked for communication via a suitable bus 90 with a display system 22 and/or an audio system 20 of the vehicle 14. The second RF transceiver 10b is integrated with a home PC 92. The home PC 92 is linked to the Internet.

The user uses the home PC 92 to retrieve information from the Internet (e.g., audio books, news, weather, music, etc.) at a convenient time. Once this information is received by the home PC 92 it is transmitted via the high-speed wireless communications link between the two RF transceivers 10a and 10b automatically. For this to occur, it will be appreciated that the vehicle 14 will need to be parked in the proximate vicinity of the home PC 92 (i.e., within about 100 meters of the home PC 92). In this regard it will also be appreciated that a suitable amount of random access memory (RAM) is provided in association with the display 22 and/or the vehicle audio system 20 for storing the information. The user can then display or play back the information while traveling in the vehicle 14 at the user's convenience. If the data is audio data, then it is played back through the vehicle audio system 20. Even text information which is received may be converted to audio information if a suitable text-to-speech conversion circuit is provided. The information stored could comprise traffic information, daily calendar reminders, appointments or events, e-mail messages, etc., in addition to the book, news, weather and music information mentioned above.

Obtaining Point of Interest Information Via a Wireless Link

Figure 10:
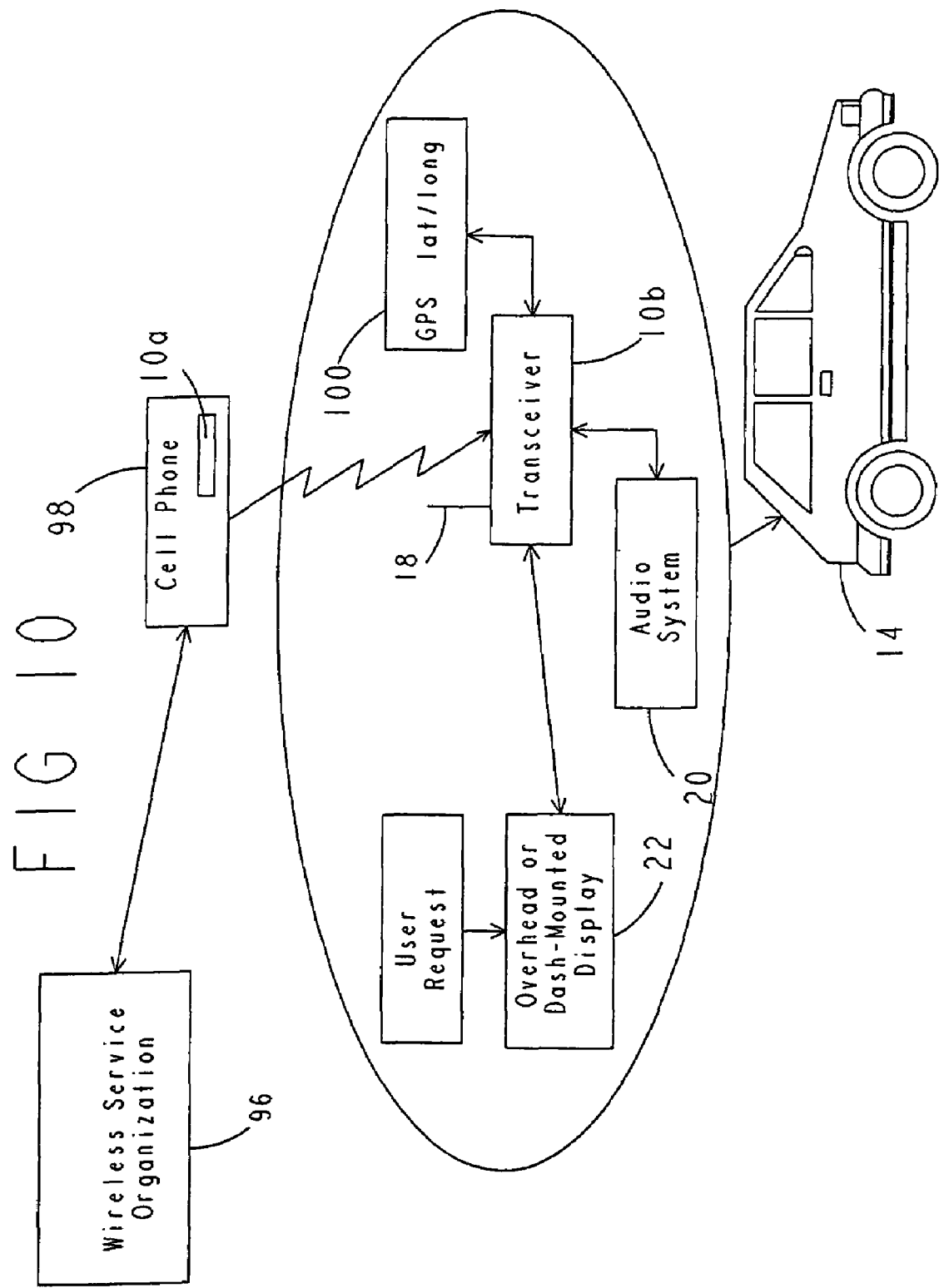
FIG. 10 is a block diagram of the wireless communications system of the present invention being used to establish a wireless communications link between a cellular phone and various electronic subsystems of a motor vehicle after the cellular phone has linked with a wireless service organization.

Referring to FIG. 10, the wireless communications system 10 can also be used to enable information relating to various "points of interest" along a route being traveled by the user. This information could also be "personalized" information for the user from an Internet-based information service.

In this implementation, a cellular phone 98 is used by the user to make a connection with a wireless service organization 96. The cellular phone 98 includes the first RF transceiver 10a while the vehicle 14 includes the second RF transceiver 10b. A Global Positioning System ("GPS") device 100 on-board the vehicle 14 can be used to transmit latitude/longitude information to the cellular phone 98 over the wireless communications link established between the two RF transceivers 10a and 10b. The cellular phone 98 in turn can be used to link this information back to the wireless service organization 96. The wireless service organization 96 then transmits information on various points of interest near the vehicle's latitude and longitude coordinates back to the cellular phone 98, which in turn transmits this information via a wireless, high speed data link from its RF transceiver 10a to the RF transceiver 10b. The information is then displayed on the vehicle's display 22 and/or played over the vehicle's audio system 20. The point of interest information can include a wide variety of useful information such as restaurants, shopping, service stations, hospitals and other establishments in the vicinity of the vehicle. The information could be displayed in a menu format in which the user is able to select establishments and is provided with directions on the display system 22 to each establishment selected. Additional information concerning traffic conditions, road construction, etc., could also be provided.

Using "Push" Information Services from the Internet

Figure 11:
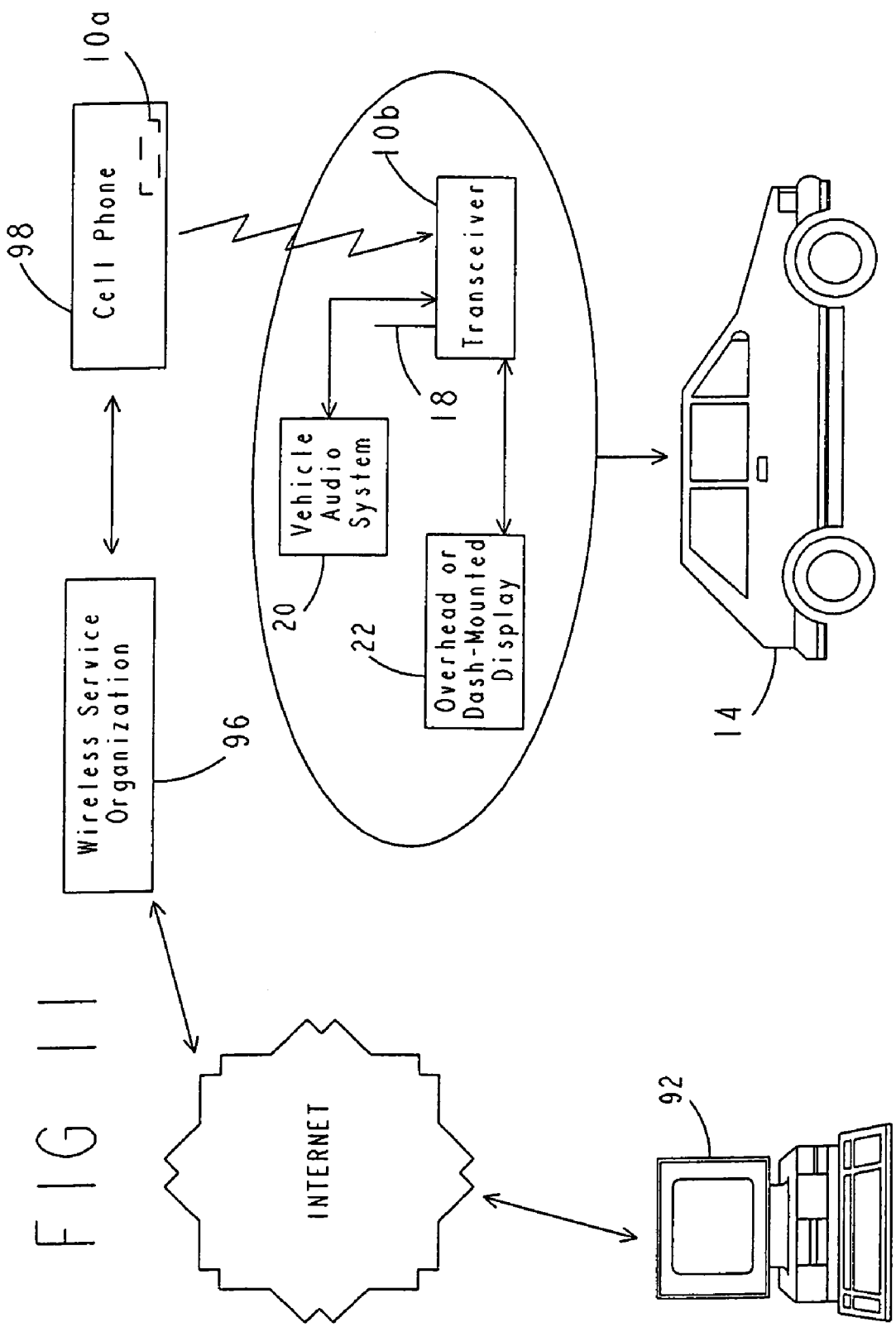
FIG. 11 is a block diagram of the wireless communications system of the present invention being used to establish a wireless data link between a cellular phone of a user and one or more subsystems of a vehicle, where the cellular phone is linked with a wireless service organization so that "push" services from an Internet service provider can be used to provide personalized traffic, weather or other information automatically from the Internet to the user as the user travels in the vehicle.

Referring to FIG. 11, another implementation of the wireless communications system 10 is illustrated where "Push" technology is used to download information from the Internet automatically to the user traveling in the vehicle 14. A cellular phone 98 having the first RF transceiver 10a of the wireless communications system 10 establishes an automatic, high-speed wireless communications link with the second RF transceiver 10b located in the vehicle 14. The transceiver 10b is in communication with the vehicle's display system 22 and/or the vehicle's audio system 20.

The wireless service organization 96 is linked to the Internet and to the cellular phone 98. The user can use his/her home PC 92 (or alternatively a business PC) to create a "personalized" website through one of the presently available Internet-based news/search companies so that various personalized information such as selected financial information (i.e., stock price information), world or local news, traffic information along a specified route of travel, phone directory or personal calendar information, weather information, e-mail, etc., can be downloaded by the wireless service organization 96 and provided to the cellular phone 98. The RF transceivers 10a and 10b can then be used to transmit the information to the vehicle's display system 22 or audio system 20.

Map/Directions Downloaded While the Vehicle is at a Service Station

Figure 12:
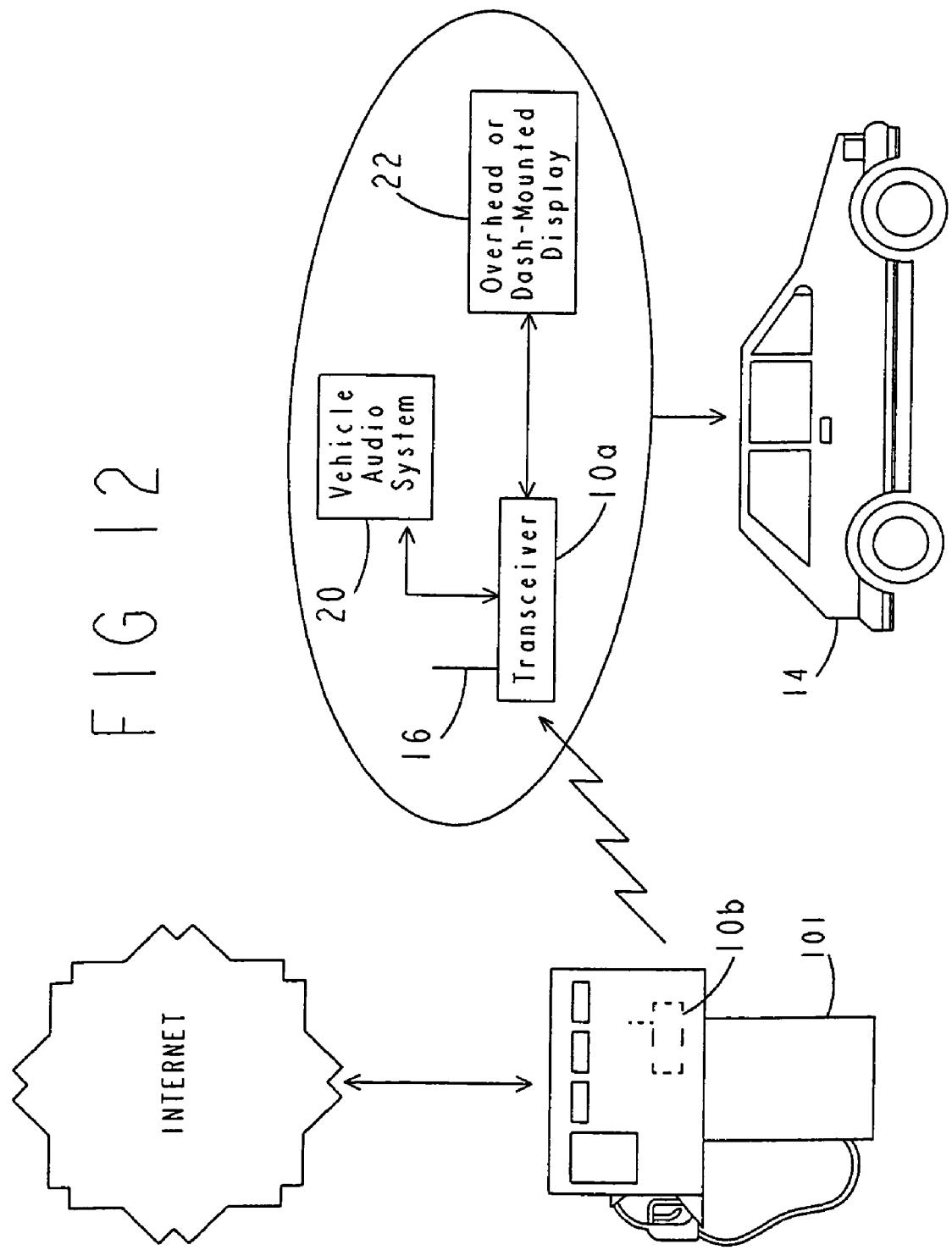
FIG. 12 is a block diagram of the wireless communications system of the present invention being used to create a wireless data link between a gas pump kiosk of a service station and the subsystems of a vehicle, where the gas pump is linked to the Internet, such that information from the Internet can be transmitted in wireless fashion to one or more electronic subsystems of the vehicle while the vehicle is parked near the gas pump.

Referring to FIG. 12, a variation of the implementation shown in FIG. 11 is illustrated in which existing Push technology is used to download personalized information from an Internet based information service to a suitable electronic system located at or closely adjacent to a gasoline pump 100, or at a kiosk including the gasoline pump 100, when the user's vehicle 14 comes within the vicinity of the gasoline pump 100. In this implementation, the gasoline pump 100 includes the electronic device 12 which includes the RF transceiver 10b, and the vehicle 14 includes the RF transceiver 10a. The RF transceiver 10a is in communication with the vehicle's display 22 and/or audio system 20. When the vehicle 14 comes into reasonably close proximity (e.g., within 10 meters of the gasoline pump 100), the RF transceiver 10a automatically establishes a high speed, wireless communications link with the RF transceiver 10b of the electronic device 12. The RF transceiver 10a transmits appropriate identifying information to the RF transceiver 10b via the automatically established wireless communications link. This information is then linked to the Internet-based information service. Information is then transmitted back to the electronic system 12 associated with the gasoline pump 100. The information is then transmitted over the wireless communications link to the RF transceiver 10a located in the vehicle 14. It will be appreciated that this personalized information could also be obtained from the Internet by establishing wireless communications links with electronic devices located on road signs, freeway overpasses, at traffic lights and other points along a road or highway.

Maps/Directions Downloaded from a Home or Work PC

Figure 13:
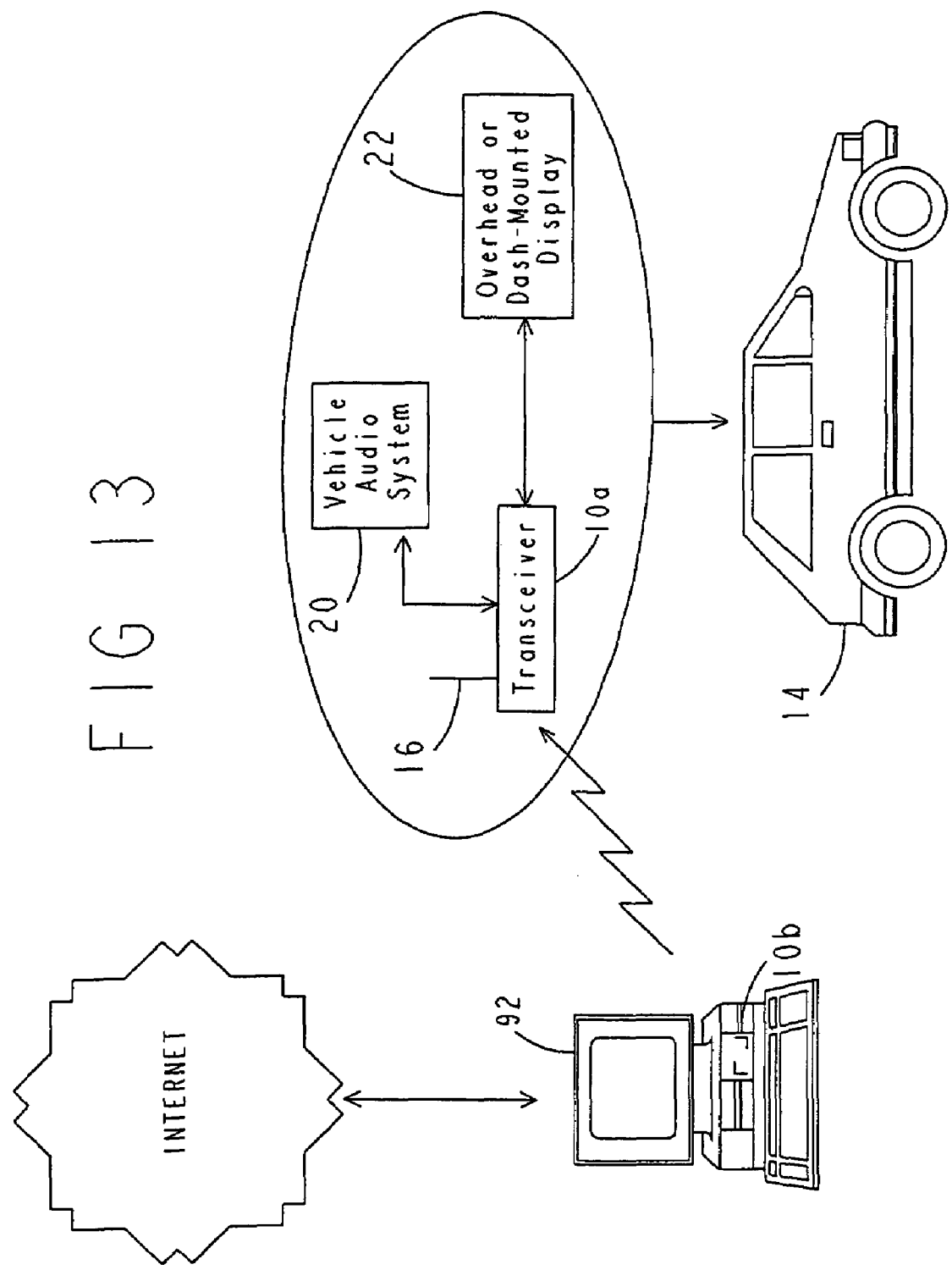
FIG. 13 is a block diagram of the wireless communications system of the present invention being used to create a wireless data link for downloading map directions downloaded onto a home PC off of the Internet directly to one or more electronic subsystems of the vehicle while the vehicle is in close proximity to the home PC.

Referring to FIG. 13, another implementation of the present invention somewhat similar to that described in connection with FIG. 12 is provided. The implementation of FIG. 13 enables the wireless communications system 10 of the present invention to provide a subset of map information needed for assisting a user of the vehicle 14 in traveling to a designated destination. In this implementation one RF transceiver 10a is located in the vehicle 14 and the other RF transceiver 10b is integrated with a PC 92, which may be located at the user's home or place of business. The user 14 can enter a command from either the PC 92 or from a suitable keyboard or control panel within the vehicle 14, or even from a cellular phone carried within the vehicle 14 and linked by two RF transceivers in accordance with the present invention, requesting directions for traveling to a particular destination. This request is transmitted to an Internet-based information organization where it is thereafter downloaded onto the PC 92. The information is then transmitted via the high-speed wireless communications link created by the RF transceivers 10a and 10b back to the vehicle 14 where it may be displayed on the vehicle's display 22 or possibly played on the vehicle's audio system 20. Since only a limited amount of information pertaining to the specific directions requested is transmitted back to the vehicle 14, this significantly reduces the amount of memory required to be located on-board the vehicle 14. It will be appreciated that this map information could just as easily be provided by linking to an electronic subsystem associated with the gasoline pump 100 (FIG. 12) or at some other location if the user becomes lost and suddenly requires directions to a different destination.

Information "Pushed" into Fleet Vehicles

Referring now to FIG. 14, another implementation of the wireless communications system 10 is provided in which information from a business or a company is "pushed" into a company vehicle 14 from a corporate message center or corporate PC 102. The information from the corporate message center or PC 102 is transmitted via the Internet to the wireless service organization 96. A communications link is established between the wireless service organization 96 and the user's cellular phone 98. The cellular phone 98 includes one RF transceiver 10a of the apparatus of the present invention 10 and the vehicle 104 includes the second RF transceiver 10b. Again, the RF transceiver 10b is in communication with the vehicle's display 22 and/or the vehicle's audio system 20. Important business information received by the cellphone 98 can then be downloaded via the wireless communications link created by the RF transceivers 10a and 10b to the user to apprise the user of important corporate news, events, scheduling or other information which needs to transmitted to the user on a timely basis. Again, this information could be relayed through suitable electronic relaying devices provided at gasoline pumps or at other points such as intersections, freeway overpasses, etc. that the vehicle 14 is expected to pass in proximity to during use.

It will be appreciated than that an extremely large variety of useful implementations of the wireless communications system 10 of the present invention may be created. While the Bluetooth communications standard or the SWAP-CA standard may be used with the RF transceivers 10a and 10b of the present invention, it will be appreciated that other communications specifications may also be employed. Additionally, while many of the implementations described herein have made use of a motor vehicle, it will be appreciated that the RF transceivers 10a and 10b could just as easily be used to effect high-speed wireless communications links between virtually any two electronic devices which come into proximity with one another, and where it would be useful to transfer information from one device to the other.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings and the present specification.

What is claimed is:

1. A system for enabling use of a hand-held wireless phone in a vehicle, comprising:
   a microphone;
   a radio frequency transceiver coupled to the vehicle and the microphone configured to communicate wirelessly and directly with the hand-held wireless phone external to the radio frequency transceiver and within the vehicle in accordance with a Bluetooth standard communications protocol; and
   an audio system coupled to the vehicle and coupled to the radio frequency transceiver and microphone,
   wherein the radio frequency transceiver, microphone and audio system are configured to provide two-way communication of audible signals between a vehicle occupant and the hand-held wireless phone via the radio frequency transceiver, wherein the system is configured to place a call via the hand-held wireless phone based on numbers spoken into the microphone and transmitted via the radio frequency transceiver to the hand-held wireless phone, and wherein the system is configured to receive audible signals at the radio frequency transceiver transmitted from the hand-held wireless phone and to provide the received audio signals to the vehicle occupant through the audio system.

2. The system of claim 1, wherein the audio system is integrated within the visor or rearview mirror.

3. The system of claim 2, wherein the audio system comprises a speaker configured to provide audible signals to the vehicle occupant.

4. The system of claim 1, further comprising a recording system coupled to the audio system configured to record the audible signals received from the vehicle occupant.

5. The system of claim 4, further comprising a switch coupled to the recording system, wherein the recording system begins recording the audible signals in response to operator actuation of the switch.

6. The system of claim 4, wherein the audio system further comprises a speaker and the recording system further comprises a playback system, wherein the playback system is configured to play back audible signals recorded on the recording system via the speaker.

7. The system of claim 1, wherein the system receives power from the vehicle battery.

8. The system of claim 1, further comprising a display coupled to the radio frequency transceiver configured to display data received from the hand-held wireless phone.

9. The system of claim 1, wherein the radio frequency transceiver is configured to communicate over a limited range having a limit under about 100 meters.

10. A method for enabling "hands free" use of a hand-held wireless phone in a vehicle, comprising:
  receiving first audible signals from a vehicle occupant at a vehicle-installed radio frequency transceiver, wherein the first audible signals include a number to be called;
  sending the first audible signals over a wireless communication link operated in accordance with a Bluetooth communications standard directly from the vehicle-installed radio frequency transceiver to the hand-held wireless phone;
  placing a call at the hand-held wireless phone using the number to be called;
  receiving second audible signals over the wireless communication link at the vehicle-installed radio frequency transceiver from the hand-held wireless phone; and
  sending the second audible signals to a vehicle occupant via a vehicle-installed audio system coupled to the vehicle-installed radio frequency transceiver.

11. The method of claim 10, wherein the audio system is integrated within the visor or rearview mirror.

12. The method of claim 10, further comprising receiving the first audible signals at a microphone mounted in the vicinity of the vehicle occupant and sending the second audible signals to the vehicle occupant via a speaker mounted in the vehicle.

13. The method of claim 10, further comprising recording in a memory the first or second audible signals.

14. The method of claim 13, further comprising receiving a signal from an operator-actuated switch and beginning the recording of the first or second audible signals in response to the received signal.

15. The method of claim 13, further comprising playing back the recorded audio signals via a speaker of the vehicle-installed audio system.

16. The method of claim 10, further comprising receiving vehicle power from the vehicle battery.

17. The method of claim 10, wherein the radio frequency transmitter is configured to communicate over a limited range under about 100 meters.

18. A wireless communication system in a vehicle, comprising:
  a microphone coupled to a vehicle interior element in the vicinity of a vehicle occupant configured to receive voice messages from the vehicle occupant;
  a Bluetooth-compatible transceiver coupled to the vehicle and to the microphone and configured to convert the voice messages into wireless data according to a Bluetooth communication standard and to transmit the voice messages wirelessly and directly to a hand-held wireless phone external to the Bluetooth-compatible transceiver and within the vehicle; and
  a speaker coupled to the Bluetooth-compatible transceiver,
  wherein the Bluetooth-compatible transceiver is further configured to receive voice messages from the hand-held wireless phone, to provide the voice messages wirelessly to the vehicle occupant via the speaker, and to place a call via the hand-held wireless phone based on numbers spoken into the microphone.

19. The wireless communication system of claim 18, further comprising a recording/playback system coupled to the microphone, the Bluetooth-compatible transceiver, and the speaker, wherein the recording/playback system is configured to record voice messages received by the microphone.

20. The wireless communication system of claim 18, wherein a wireless communication link is established between the Bluetooth-compatible receiver and the hand-held wireless phone when the hand-held wireless phone comes into proximity with the Bluetooth-compatible receiver.

21. The wireless communication system of claim 18, further comprising a display coupled to the Bluetooth-compatible receiver configured to display data received from the hand-held wireless phone.

22. A wireless communications system in an automobile having an automobile interior, comprising:
  a microphone in the automobile interior;
  a speaker in the automobile interior;
  a first Bluetooth-compatible transceiver in the automobile interior configured to communicate wirelessly and directly with a second Bluetooth-compatible transceiver in a hand-held cellular phone external to the first Bluetooth-compatible transceiver and within the automobile; and
  a system coupled to the microphone, speaker, and first Bluetooth-compatible transceiver configured to enable use of the hand-held cellular phone via the microphone and speaker in the automobile interior, to place a call based on numbers spoken into the microphone and transmitted via the first and second Bluetooth-compatible transceivers to the hand-held cellular phone, to receive voice messages from the hand-held cellular phone, to provide the voice messages wirelessly to a vehicle occupant via the speaker.

23. The wireless communications system of claim 22, further comprising a display in the automobile interior, wherein the system is configured to display incoming call information received via the hand-held cellular phone.

24. The wireless communications system of claim 23, wherein the system is configured to display a "low battery" warning indicating a low battery power condition for the hand-held cellular phone.

25. The wireless communications system of claim 22, wherein the system is configured to provide a speech recording/playback function.

26. The wireless communications system of claim 22, wherein the system is coupled to the microphone, speaker and first Bluetooth-compatible transceiver via wired connections.

* * * * *

UNITED STATES PATENT AND TRADEMARK OFFICE
CERTIFICATE OF CORRECTION

PATENT NO. : 7,257,426 B1
APPLICATION NO. : 09/979199
DATED : August 14, 2007
INVENTOR(S) : Todd R. Witkowski et al.

It is certified that error appears in the above-identified patent and that said Letters Patent is hereby corrected as shown below:

Column 12, line 35, delete "car".

Column 12, line 42, delete "transducer" and insert --transceiver--.

Column 13, line 7, delete "10b" and insert --10a--.

Column 15, line 9, delete "100" and insert --101--.

Column 15, line 11, delete "100" and insert --101--.

Column 15, line 12, delete "100" and insert --101--.

Column 15, line 17, delete "100" and insert --101--.

Column 15, line 26, delete "100" and insert --101--.

Column 15, line 47, delete "14".

Column 15, line 65, delete "100" and insert --101--.

Column 16, line 13, delete "104" and insert --14--.

Claim 1, (Column 17, line 9) delete "audio" and insert --audible--.

Claim 2, (Column 17, line 12) delete "the" and insert --a--.

Claim 10, (Column 17, line 52) delete "a" and insert --the--.

Claim 11, (Column 17, line 56) delete "the" and insert --a--.

UNITED STATES PATENT AND TRADEMARK OFFICE
CERTIFICATE OF CORRECTION

PATENT NO. : 7,257,426 B1
APPLICATION NO. : 09/979199
DATED : August 14, 2007
INVENTOR(S) : Todd R. Witkowski et al.

It is certified that error appears in the above-identified patent and that said Letters Patent is hereby corrected as shown below:

Claim 15, (Column 18, line 2) delete "audio" and insert --audible--.

Claim 20, (Column 18, line 42) delete "receiver" and insert --transceiver--.

Claim 21, (Column 18, line 45) delete "receiver" and insert --transceiver--.

Signed and Sealed this

Twenty-ninth Day of July, 2008

JON W. DUDAS
*Director of the United States Patent and Trademark Office*